H. F. DUROW.
CORN PLANTER.
APPLICATION FILED MAY 13, 1913.
1,099,972.
Patented June 16, 1914.
2 SHEETS—SHEET 2.
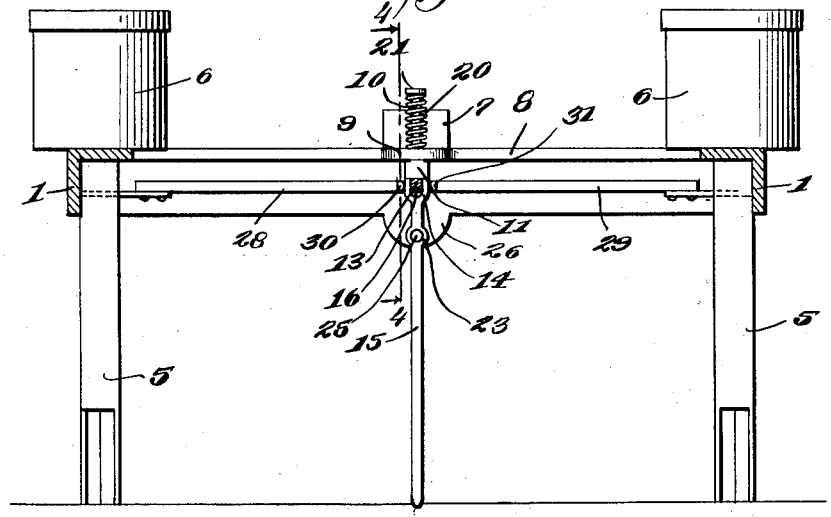
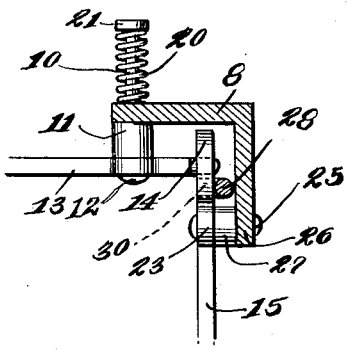
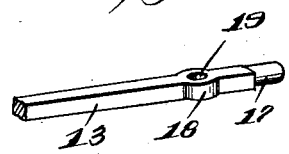
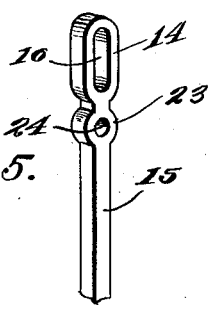
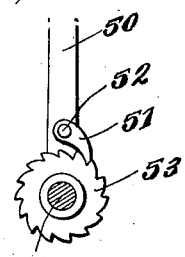
WITNESSES
INVENTOR
Herman F. Durow,
by Richard Dewen
his Attorney

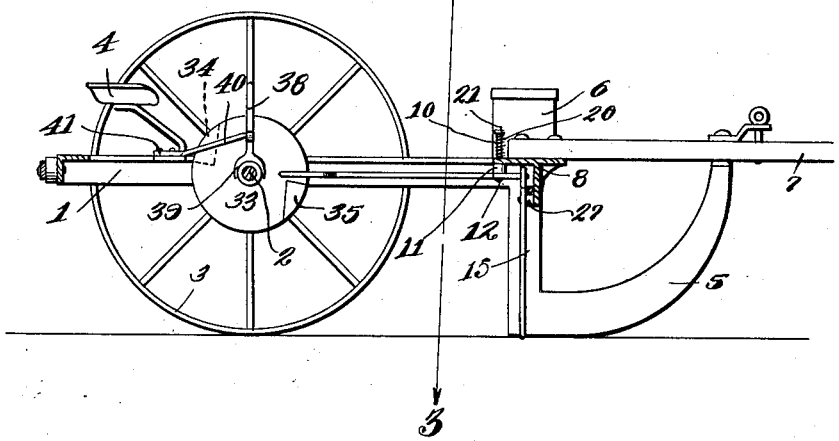
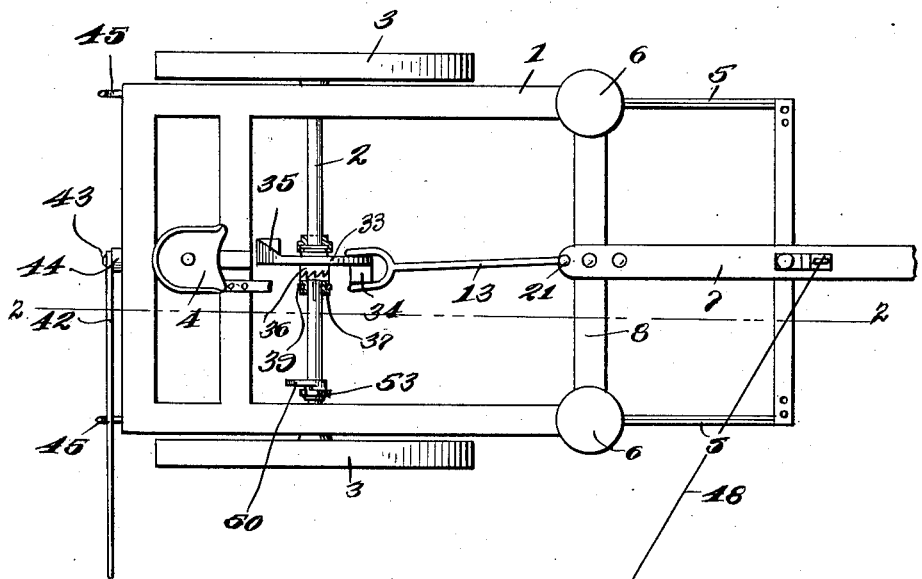

UNITED STATES PATENT OFFICE.

HERMAN F. DUROW, OF ST. JAMES, MINNESOTA.

CORN-PLANTER.

1,099,972.  Specification of Letters Patent.  Patented June 16, 1914.

Application filed May 13, 1913. Serial No. 767,388.

*To all whom it may concern:*

Be it known that I, HERMAN F. DUROW, a citizen of the United States, residing at St. James, in the county of Watonwan and State of Minnesota, have invented certain new and useful Improvements in Corn-Planters, of which the following is a specification.

This invention relates to improvements in corn planters and more particularly to that class of corn planters in which the corn is dropped in checked rows without the aid of a knotted wire stretched across the field, but in which the power for actuating the seed dropping mechanism is derived from the rotation of the traction wheels.

An object of this invention is to provide a practical and efficient marker which will mark the location of the hills or places in which the seed has been planted, thus providing a means whereby the operator of the planter may know at what point to throw the seed dropping mechanism in gear when starting a new row in order that the hills of grain may be evenly spaced across the field.

A further object of this invention is to provide means for operating the marker direct by the rotation of the traction wheels and to construct this means in such a manner that the seed dropping mechanism will be operated simultaneously with the marker.

With the foregoing and other objects in view, this invention consists of such novel features of construction, combination and arrangement of parts as will be hereinafter more fully described, illustrated in the accompanying drawings and claimed.

In describing the invention in detail, reference will be had to the accompanying drawings wherein like characters denote like or corresponding parts throughout the several views, and in which:

Figure 1 is a longitudinal sectional view through the corn planter on line 2—2 of Fig. 2; Fig. 2 is a top plan view of the improved corn planter; Fig. 3 is a cross sectional view taken on the line 3—3 of Fig. 1; Fig. 4 is a sectional detail view of a part of the marker and the mechanism for operating the same taken on line 4—4 of Fig. 3; Fig. 5 is a detail perspective view of a lever employed in operating the marker; Fig. 6 is a detail perspective view of an end of a second lever used in connection with the device; and Fig. 7 is a fragmentary side elevation of a view showing the ratchet wheel and a lever mounted on shaft, in section, and a pawl pivotally mounted on a lever, the ratchet, the pawl, and the lever constituting a means for moving the planter forward when desired.

In referring to the drawings by numeral, 1 designates a frame of a corn planter which has a shaft 2 mounted in bearings thereupon. The shaft 2 rigidly carries the traction wheels 3 on its outer ends, which traction wheels are positioned adjacent the exterior of the frame 1. The usual type of seat 4, shoes 5, seed boxes 6, and tongue 7 are employed.

The seed boxes 6 are mounted upon the forward ends of the frame 1 as is the custom in corn planters and at the front end of the frame has a bar 8 extending laterally across the planter. The central portion of the bar 8 is enlarged as is shown at 9 and has an aperture extending therethrough in which is mounted a pin 10. The pin 10 extends through the enlarged portion 9, passes through the collar 11 and is connected at 12 to the outer end of the lever 13 which has the upper end 14 of the marking lever 15 mounted thereupon as is clearly shown in Figs. 3 and 4 of the drawings. The upper end 14 of the marking lever 15 is enlarged and has a slot 16 extending longitudinally therein. The slot 16 in the upper end 14 receives the rounded end 17 of the lever 13. The lever 13 has a portion 18 near its outer end enlarged and provided with an aperture 19 extending therethrough which receives the end of the pin 10 and upon which pin the lever 13 pivots. A coil spring 20 is mounted about the pin 10 between the head 21 of the same and the upper side of the angle bar 8 and pulls the lever 13 adjacent the collar 11 and also allows the operation of the same.

The marking lever 15 is provided with an enlargement 23 a short distance inward from the end 14 of the same which enlargement is provided with an aperture 24 through which a pin 25 is inserted for pivotally mounting the lever upon the projection 26 formed upon the lower edge of the angle bar 8. A collar 27 is mounted between the inner side of the projection 26 and the lever 15.

The seed dropping mechanism has rods 28 and 29 extending inwardly from the seed boxes 6 and which rods have lugs 30 and 31 formed thereupon near their inner ends. The lugs 30 and 31 are so arranged that when the lever 15 is operated the sides of the enlarged end 14 will engage the lugs 30 and 31, causing them to reciprocate and to allow the dropping of the grain seeds through the shoes 5 into the ground.

The rear end of the lever 13 is bifurcated and this bifurcated end receives a disk 33 between the two arms formed by the bifurcation. The disk 33 is keyed or otherwise loosely mounted upon the shaft 2 and has two lugs 34 and 35 formed upon its opposite faces. A clutch collar 36 is also formed upon one side of the disk 33 and the teeth of the same engage the teeth of the second clutch collar 37 which is slidably mounted or feathered upon the shaft 2. The clutch collar 37 is operated by a lever 38 which has the usual bifurcated end 39 connected to a ring or seated in an annular groove within the clutch collar as is commonly used. The lever 38 is pivotally mounted upon one end of the rod 40 which is in turn rigidly secured to the frame 1 as at 41.

A row marker 42 is pivotally connected to the rear of the frame 1 of the corn planter as is shown at 43 and has a block 44 interposed between the end of the same which is pivoted to the frame. Supporting hooks 45 are mounted upon the outer ends of the corn planter and form a means for holding the marker 42 in its proper position and to prevent it from dragging upon the ground. The end 46 of the marker 42 has any suitable means 47 mounted thereupon for making a mark or indentation in the soil to designate the position where the next row of corn is to be planted. A wire 48 is connected to a marker 42 and to the tongue 7 at any suitable place and forms an auxiliary support for the marker 42.

A lever 50 which has a pawl 51 pivotally mounted thereupon by means of the pin 52, is mounted upon the drive shaft or axle 2 of the machine. The pawl 51 engages the serrations of a ratchet wheel 53 which is rigidly mounted upon the shaft 2 as is clearly shown in Fig. 7 of the drawings.

When starting to plant a new row of corn the planter will not, in many instances be properly placed so that the new row of corn will be in alinement in all directions with the hills of corn already planted, thus it is necessary to move the planter forward a short distance. The lever 50 and the ratchet wheel 53 are provided for this purpose for by operating the lever 50 back and forth or in an oscillatory movement the pawl 51 by engaging the teeth of the ratchet wheel 53 rotates the axle or shaft and also the wheels 3 moving the corn planter forward to the desired position. During the movement of the lever 50, the lever 38 is moved so that the clutch will be thrown out of gear thus allowing the shaft 2 to rotate without imparting movement to the planter mechanism.

In the operation of the device, the lugs 34 and 35 which are formed upon the opposite faces of the disk 33, will during the rotation of the traction wheels 3 of the device alternately engage the bifurcated end of the lever 13, this will cause the lever 13 to move back and forth upon the lower end of the pin 10 and the rounded end of the lever being seated in a slot 16 formed in the lever 15, will also cause the lever 15 to operate upon the pivoting pin 25. The lower end of the lever 15 engaging the ground, will when the lever is pivotally operated make a mark in the soil upon each operation of the lever or, in other words, each time one of the lugs 34 or 35 engages the bifurcated end of the lever 13, the marker 15 will be operated and will make a mark in the soil. The seed mechanism operating rods 28 and 29 having the lugs 30 and 31 thereupon which are engaged by the upper end 14 of the lever 15 upon the operation of the latter will cause the seed dropper mechanism and the marker 15 to operate simultaneously.

In practical fields, certain minor features of construction, combination and arrangement of parts may necessitate alterations to which the patentee is entitled, provided such alterations are comprehended within the scope of what is claimed.

What is claimed is:—

1. In a corn planter, the combination of seed dropping mechanism, a marker pivotally mounted upon the cross piece of the frame of the planter, a lever connected to the upper end of said marker, a pin mounted in the corn planter frame, said lever pivotally mounted upon said pin and having its rear ends bifurcated, means mounted on the traction shaft of the corn planter for engaging the said bifurcated end for operating said marker, and means connecting said marker and said seed dropping mechanism whereby said marker and said seed dropping mechanism will operate simultaneously.

2. In a corn planter, the combination of seed dropping mechanism, a marker pivotally mounted upon the cross piece of the frame of the planter, a lever connected to the upper end of said marker, a pin mounted in the corn planter frame, said lever pivotally mounted upon said pin and having its rear ends bifurcated, a disk loosely mounted upon the traction shaft of the corn planter, lugs formed upon the opposite faces of said disk, said lugs adapted to alternately engage said bifurcated end for operating said marker, means for holding said disk in or out of operation, and means connecting said marker and said seed dropping mechanism whereby said marker and said seed dropping mechanism will operate simultaneously.

3. In a corn planter, the combination of traction wheels, a supporting axle for said wheels, seed dropping mechanism, a marker mounted between the traction wheels, means for actuating said marker, said means being operated by the rotation of the traction wheels of the planter, means connecting said marker and said seed dropping mechanism whereby the marker and seed dropping mechanism will operate simultaneously, means for marking the location of the adjacent row of corn, and means for partially rotating said supporting axle for moving the corn planter a short distance forward.

4. In a corn planter, the combination of seed dropping mechanism, a marker pivotally mounted upon the cross piece of the frame of the planter, a lever connected to the upper end of said marker, a pin mounted in the corn planter frame, said lever pivotally mounted upon said pin and having its rear end bifurcated, means mounted on the traction shaft of the corn planter for engaging the said bifurcated end for operating said marker, means for marking the location of the adjacent row of corn, and means for partially rotating said supporting axle for moving the corn planter a short distance forward.

5. In a corn planter, the combination of traction wheels, a supporting axle for said wheels, seed dropping mechanism, a marker pivotally mounted upon the cross piece of the frame of the planter, a lever connected to the upper end of said marker, a pin mounted in the corn planter frame, said lever pivotally mounted upon said pin and having its rear end bifurcated, means mounted on the supporting axle of the corn planter for engaging the said bifurcated end for operating said marker, means connecting said marker and said seed dropping mechanism whereby said marker and said seed dropping mechanism will operate simultaneously, and means for partially rotating said supporting axle for moving the corn planter a short distance forward.

6. In a corn planter, the combination of traction wheels, a supporting axle for said wheels, seed dropping mechanism, a marker pivotally mounted upon the cross piece of the frame of the planter, a lever connected to the upper end of said marker, a pin mounted in the corn planter frame, said lever pivotally mounted upon said pin and having its rear end bifurcated, a disk loosely mounted upon the supporting axle for the corn planter, lugs formed upon the opposite faces of said disk, said lugs adapted to alternately engage said bifurcated end for operating said marker, means for holding said disk in or out of operation, means connecting said marker and said seed dropping mechanism whereby said marker and said seed dropping mechanism will operate simultaneously, means for marking the location of the adjacent row of corn and means for partially rotating said supporting axle for moving the corn planter a short distance forward.

In testimony whereof I affix my signature in presence of two witnesses.

HERMAN F. DUROW.

Witnesses:
CHARLES RENTZ,
H. S. LARSON.

---

Copies of this patent may be obtained for five cents each, by addressing the "Commissioner of Patents, Washington, D. C."